(No Model.)

J. WATKINS.
JAW TRAP.

No. 421,639. Patented Feb. 18, 1890.

WITNESSES
C. M. Newman,
Asley J. Munson.

INVENTOR
John Watkins
H. M. Wooster
Atty.

United States Patent Office.

JOHN WATKINS, OF BRIDGEPORT, CONNECTICUT, ASSIGNOR OF ONE-HALF TO JOHN WELDON, OF SAME PLACE.

JAW-TRAP.

SPECIFICATION forming part of Letters Patent No. 421,639, dated February 18, 1890.

Application filed November 9, 1889. Serial No. 329,759. (No model.)

*To all whom it may concern:*

Be it known that I, JOHN WATKINS, a citizen of the United States, residing at Bridgeport, in the county of Fairfield and State of Connecticut, have invented certain new and useful Improvements in Steel Traps; and I do hereby declare the following to be a full, clear, and exact description of the invention, such as will enable others skilled in the art to which it appertains to make and use the same.

My invention relates to the construction of steel traps, and has for its object to simplify and improve their operation in use without increasing the cost of production, my improvements being equally adapted to large and small sized traps. With these ends in view I have devised special details of construction by which the trap is made self-setting, is provided with a hard and an easy set, and which enable the operator to fasten the bait quickly and securely without the necessity of tying it with a string.

My several improvements will be found clearly illustrated in the accompanying drawings, forming part of this specification, in which—

Figure 1:
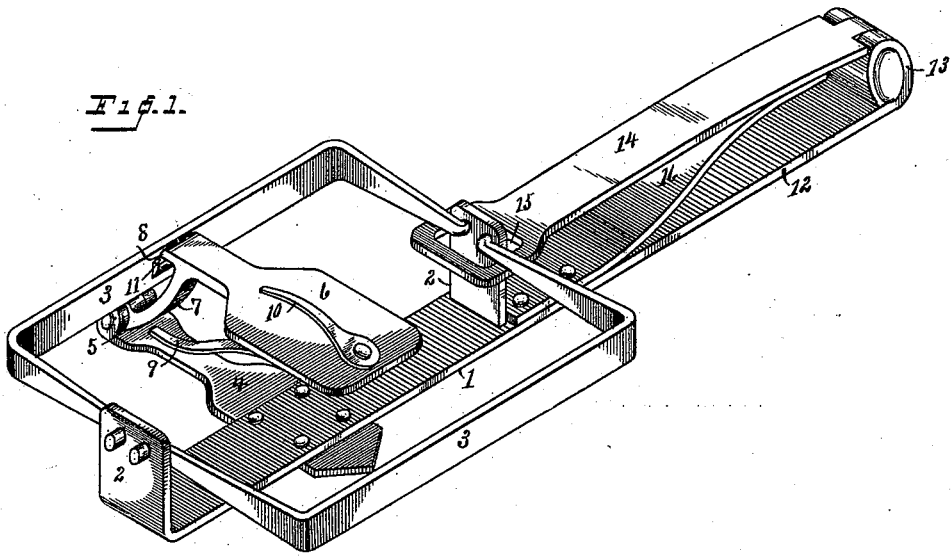
Figure 2:
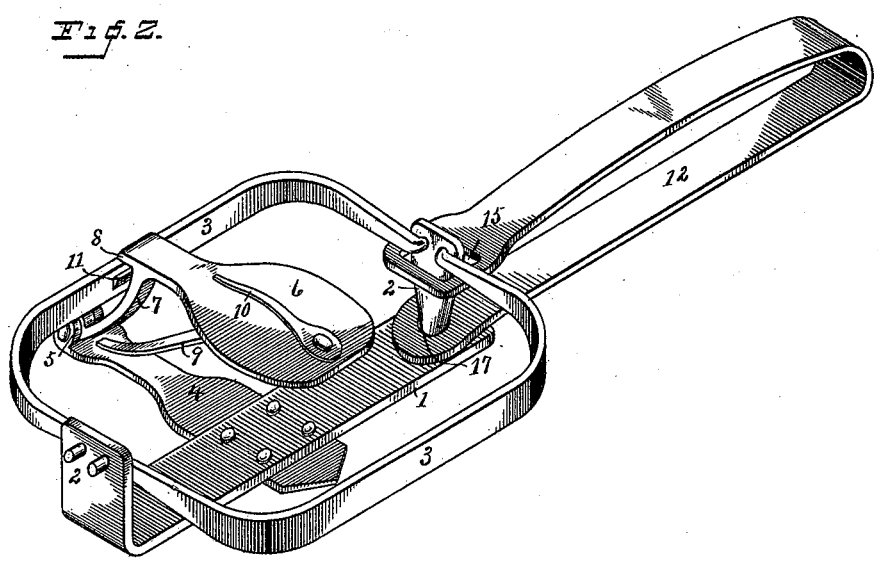

Figures 1 and 2 are perspectives of steel traps in the set position, slight changes in the details of construction being shown in the two figures, and Fig. 1 showing the easy set and Fig. 2 the hard set.

1 denotes the base of the trap, having uprights 2, in which the jaws 3 are pivoted in the usual manner.

4 denotes a cross-piece pivoted to the base midway the length of the jaws, and having at one end ears 5, to which the bait-holder is pivoted. This bait-holder consists of a plate 6, a downwardly-extending arm 7, which is pivoted to ears 5, a setting-catch 8, a setting-spring 9, one end of which is pivoted to plate 6, the lower end extending down and bearing against the cross-piece, and a prong 10 upon the upper side of the plate, by which the bait is held in position. In practice, the setting-spring and prong are both secured to the plate by a single rivet, which passes through and is headed on both sides. Upon the inner side of one of the jaws (the left preferably, when the trap is in the position shown in the drawings) I provide a ledge 11, said ledge or the face of the jaw itself being adapted to be engaged by the setting-catch, as will presently be more fully explained.

In the form shown in Fig. 1, which is especially adapted for large heavy traps, I have shown the base extended to form a shank 12, having ears 13 at its outer end, to which the closing-arm 14 is pivoted, this arm being widened at its inner end and provided with an opening 15, through which the upright passes, as shown in both forms in the drawings, and which, when the trap is sprung, moves upward over both jaws, throwing them to the closed position in the usual manner. 16 denotes a closing-spring, the inner end of which is pivoted at the inner end of the shank, and the outer end of which curves upward and bears against the outer end of the closing-arm, its action being to throw the closing-arm to the raised position—that is, the normal or "sprung" position of the trap—which I have not deemed to require illustration in the drawings.

In the form illustrated in Fig. 2, the shank, closing-arm, and closing-spring are formed from a single piece of spring-steel, bent to the proper form, as clearly shown, the shank portion having an opening 17, through which one of the uprights passes, the shank turning freely thereon, and the spring portion having an opening 15, which is adapted to pass over the top of the upright, as shown in the drawings, and through which one end of the jaws pass when in the sprung position, as in the other form and as is common in this class of traps. If preferred, the shank and closing-arm may be hinged together, and the closing-arm raised by an independent closing-spring, as in Fig. 1, the shank, however, being made independent of the base and turning on the inner upright, as in Fig. 2. This being an obvious modification of the construction shown is not deemed to require special illustration.

The operation is as follows: Prong 10 has more or less spring, so that the bait may be pressed under it, if preferred, and is also sharpened, as shown, at its outer end, so that it may be forced into a piece of bait, said prong acting in either case to hold the bait firmly in position. In setting, the operator simply has to press down the closing-arm against the power of the closing-spring. This allows the jaws to drop down to the open position, as in the drawings, the left jaw in the position shown coming in contact with the top of the setting-catch 8. The upper edge of the catch may be beveled slightly, as shown in the drawings, so as to insure that it will yield against the power of setting-spring 9, and allow the jaw to slip over the edge and pass down below it. The instant the jaw has passed the catch, however, the setting-spring will act to force the setting-catch into engagement, either with the ledge, as shown in Fig. 1, for an easy set, or with the edge of the jaw itself, as shown in Fig. 2, for a hard set, thus making the trap self-setting when the jaws are placed in the open position. This is a great convenience in setting traps of this class, and renders it unnecessary under any circumstances for the operator to place his hand between the jaws.

Having thus described my invention, I claim—

1. The combination, with the jaws of a steel trap, one of which is provided with a ledge 11 upon its inner side, of a bait-holder having a catch of sufficient length to engage either the ledge or the edge of the jaw, and an arm by which it is pivoted in place, and a spring acting to throw the catch into the engaged position so as to give a hard set when the catch is in engagement with the jaw, or an easy set when in engagement with the ledge.

2. The combination, with the jaws, bait-holder, and setting mechanism of a steel trap, of a base, a shank 12, a closing-arm pivoted thereto, and a spring pivoted to the shank and engaging the outer end of the closing-arm, whereby the latter is thrown to the closed position.

In testimony whereof I affix my signature in presence of two witnesses.

JOHN WATKINS.

Witnesses:
A. M. WOOSTER,
ARLEY I. MUNSON.